United States Patent [19]
Hartramph et al.

[11] Patent Number: 6,037,739
[45] Date of Patent: Mar. 14, 2000

[54] ELECTROMAGNETIC DRIVE SYSTEM WITH INTEGRATED PATH SIGNAL GENERATION

[75] Inventors: Ralf Hartramph, Waiblingen; Wolfgang Schinköthe, Stuttgart, both of Germany

[73] Assignee: Festo AG & Co, Esslingen, Germany

[21] Appl. No.: 09/298,036

[22] Filed: Apr. 22, 1999

[51] Int. Cl.⁷ .................................................. G05B 11/00
[52] U.S. Cl. ............................................ 318/687; 318/135
[58] Field of Search .................................. 318/687, 135, 318/115, 114, 119

[56] References Cited

U.S. PATENT DOCUMENTS

| | | | |
|---|---|---|---|
| 4,352,048 | 9/1982 | Schulze | 318/135 |
| 5,257,014 | 10/1993 | Zimmermann | 340/686 |
| 5,434,459 | 7/1995 | Pinkerton | 310/20 |
| 5,729,067 | 3/1998 | Janutka | 310/135 |
| 5,783,915 | 7/1998 | Shida et al. | 318/135 |

OTHER PUBLICATIONS

Ogasawara, et al.; IEEE Transactions On Industry Applications, vol. 27, No. 5, *An Approach to Position Sensorless Drive for Brushless dc Motors*, (Sep./Oct. 1991).

Kulkarni, et al.; IEEE Transactions On Industry Applications, vol. 28, No. 1, *A Novel Position Sensor Elimination Technique for the Interior Permanent–Magnet Synchronous Motor Drive*, (Jan./Feb. 1992).

*Primary Examiner*—Robert E. Nappi
*Assistant Examiner*—Rita Leykin
*Attorney, Agent, or Firm*—Hoffmann & Baron, LLP

[57] ABSTRACT

An electromagnetic drive system having an integrated position signal generation for use by the drive windings for the movement and power generation and as a measuring system for determining the position of the movable partial system of the drive with respect to the stationary system, so that separate measuring systems are generated. The drive system including a stationary drive coil system of a direct current linear motor, having at least two identical partial coils which are serially connected with each other induced with a pulse length modulated control signal with a constant pulse frequency and a constant circuit voltage. For the position measurement, the impedance change in the partial coils of the coil system is picked up in accordance with the principle of an inductive voltage splitter by establishing the slopes of the electric voltage paths on the partial coils at a constant point in time after switching over the pulse length modulated control signal. By using the corresponding drive circuit for position sensing, this arrangement permits the structure of very compact positioning systems without any additional measuring systems.

8 Claims, 2 Drawing Sheets

ELECTROMAGNETIC DRIVE SYSTEM WITH INTEGRATED PATH SIGNAL GENERATION

BACKGROUND OF THE INVENTION

The invention relates to an electromagnetic drive system or motor with an integrated path signal generator in accordance with the electrodynamic effective principle. Such motors use the power EMF charges of a conductor winding induced with current in a preferably permanent excited magnetic field. The magnetic field can be principally generated not only by one permanent magnet but also by a second conductor winding which is induced with a current, however, in this case, specific permanent excited motors are of interest. For using the effective power between the two main components of the motor, the permanent magnet and the coil system for the linear or rotational movement, one of the two components (for example, the coil system) is stationary and the other (in the exemplified embodiment the permanent magnet) represents the movable output of the arrangement.

Motors of this design, for example, in accordance with DE 18 08 900 do not have internal gauges and self locking means. In order to start up or to hold a position it requires a complete control circuit with at least one measuring system for the path measuring or if constant equal lengths are required one needs a measurement for the speed (for example, Kallenbach, E. Bögelsack.G.: Gerätetechnische Antriebe.Carl Hanser Verlag, München, Wien 1991, pages 285 etc.).

External control systems which are coupled to the motor or internal control systems are known which are mechanically integrated into the total structure. However, these systems generally have separate structural parts which are independent from the drive windings, for example, control coils (for example, Kallenbach, E Bögelsack.G. Gerätetechnische Antriebe.Carl Hanser Verlag, Munchen, Wien 1991, pages 97 etc. and 249 etc.). Also known are motors or circuits which shunt a speed proportional control signal from the voltage drop through the drive winding (for example, Kühne H.: Examples for control and regulating circuits with direct current small motors. Amateurreihe electronica. Band 176. Militärverlag, Berlin 1979). For the path control, separate control systems, or at least additional structural units (control coils), are presently required.

On the other hand, motors are known, preferably rotary motors, which use the drive winding simultaneously for recognizing the position of transmissions between different field ranges and thus for shunting a communication signal through the pick up of saturation manifestations (for example, in EPE Journal, Vol.2, No.1, 1992, 5.25 to 34). However, a considerable effort is required for this crude position arrangement. An exact proportional control signal for an absolute control of the runner position cannot be practically shunted off.

The use of a position sensor in rotary or linear direct current motors, without any additional control system, had been suggested in EP 457 389, whereby the different coil parts of the motor are electromagnetically coupled through a short circuit winding. The short circuit winding is mounted on the other coil-less passive motor part and couples in a control signal in addition to the position signal into one of the part coils so as to obtain a transformer-like inductive coupling into at least another part coil which is not induced by the control signal being dependent on the position of the passive motor part, which then could be used as a control signal for the runner position. The disadvantage of this solution is the necessity of a short circuit winding on the passive motor part, on the one hand, but more the fact that the active motor part (stator with coil system) must not carry its own inductive coupling in the form of a short circuit winding or an electrically conductive magnetic yoke, on the other hand. However, due to the absence of a magnetic yoke, the motor power, and therefore the useability of the motor, is very much diminished.

A method for sensing the path of a direct current linear motor through the dual use of the coil parts as drive winding and control winding through the additional admittance of the direct current set signal with a control alternate voltage and subsequent evaluation in the form of a differential or quotient formation between the amplitudes of the part control alternate voltages is disclosed in German petty patent No.297 05 315.9. However, this device has the disadvantage that it is useable only for very small motor drive capacities due to the use of a continuous operating, analog capacity end step. Also, because the filter used in this method for preparing the signal, the control dynamic is very much impaired. Moreover, the two aforementioned suggestions require an additional control alternate voltage for generating the path signal.

SUMMARY OF THE INVENTION

The object of the present invention of an electromagnetic drive system with integrated path signal generation is therefore to divert from the voltage paths through the part coils of the pulse wide modulated started up motor of a path or angle proportioned quasi-continuous measuring value independent from the resulting motor current for the relative position between the first partial system of the motor containing the permanent magnet and the second partial system of the motor containing the coil system, thus omitting an additional external or internal path control system consisting of different structural parts, while simultaneously avoid the disadvantages of the existing known solutions. In the hitherto known solutions having a transformer-like inductive coupling, these disadvantages consist in the low push forces caused by the positive loss of a magnetic yoke, and in the known solution for a dual use of the partial coils by coupling thereon a control alternate voltage to the direct current set signal, these disadvantages consist in the impairment for the use of analog direct current end steps and therefore also in the impairment to low push forces and motor capacities. Moreover, both of the aforementioned solutions require the mentioned additional control alternate voltage.

For this purpose an electromagnetic drive system was developed with an integrated path signal generator by means of an electromotor consisting of a first partial system with at least a permanent magnet and a second partial system with a coil system with at least two identical partial coils arranged in a row which are in the permanent magnetic excited magnetic field, whereby each partial system may form the stationary stator or the movable runner. A start up circuit is provided for generating a pulse wide modulated set voltage with a constant pulse frequency and a constant circuit voltage in the coil system which is supplemented in accordance with claim 1 in such a manner that an evaluating circuit diverts the partial system by means of a separate differentiation of the voltage paths through the partial coils and subsequent subtraction or dividing of the newly created separate partial voltages at a given constant point in time after the step change (i.e., edge transition) in the pulse wide modulated set signal and a path or angle proportional quasi-continuous voltage value for the relative position between the first partial system containing the permanent magnet of the motor and the second partial system containing the coil system.

Hence, the evaluation is based on an inductance analysis for path determination in accordance with the principle of an inductive voltage divider, whereby the switching behavior is used by inductances in a series RL-network. In contrast to the use of additional high frequency control voltages the actual present set voltage is used for the evaluation in its cycled pulse wide modulated form with respect to the shown path information.

The evaluation circuit may be directly integrated into the start up circuit. Specifically in accordance with claim 3, it may also be a linear drive wherein both partial systems are displaceable with respect to each other, whereby each of the partial systems may form the stationary stator or the movable runner. In accordance with claim 4 the coil system and the permanent magnet may be essentially cylindrical and have a common symmetry axis, whereby either the permanent magnet or the coil system may be arranged displaceable in a parallel direction for a common symmetric axis, if need be along with further support elements or parts of the magnetic circuit.

One embodiment in accordance with claim 5 shows that the coil system may be encompassed with a permanent locked magnetic yoke which may be electrically conductive or nonconductive, which supports or influences the magnetic field distribution of the permanent magnetic field. Advantageous embodiments are described in claims 6 and 7 whereby a low air space and, if need be, an electrically conductive or electrically nonconductive guide bushing is provided or that two pole shoes axially arranged on the permanent magnet for an improved field guiding.

In accordance with claim 8, the total system may encompass an electronic control circuit which compares the controlled path signal ($X_{ist}$) with a predetermined path control value ($X_{soll}$) and which delivers the input dimension for a position control or path regulator, which in turn sets the drive currents in such a manner that the runner position is set to the desired position value or the movement is regulated to a desired path curve.

The advantages obtained by the invention consist, on the one hand, in that separate path systems or separate additional structural parts are omitted for the path control so that a miniaturized structure may be achieved. On the other hand, despite of the dual use of the coil system for drive and control tasks the applicability of a magnetic yoke is not impaired, so that more favorable field distributions with higher field strengths in the use air slot as well as larger drive forces are made possible in contrast to the hitherto suggested solutions. In addition, the employment of metallic guide or bearing bushings permits higher stability of the arrangement with lower wear. In light of the novel method for position pick up in accordance with the invention by using a cycled pulse wide modulated set signal and thereby switching end steps which operate almost loss free, the impairments of analog current end steps and thereby to small push forces and motor capacities are eliminated. By avoiding the use of filters in the control circuit, the control dynamic is only dependent from the circuit frequency of the pulse width modulator and is therefore significantly higher than in the hitherto known methods using additional control alternate voltages.

One exemplified embodiment of an electromagnetic drive system with an integrated path signal generation in the form of a correspondingly modified direct current linear motor and a principle circuit diagram of the control evaluation preparation and the start up are illustrated in the drawings and will be described in more detail in the following.

DETAILED DESCRIPTION OF THE PREFERRED EMBODIMENT

Figure 1:
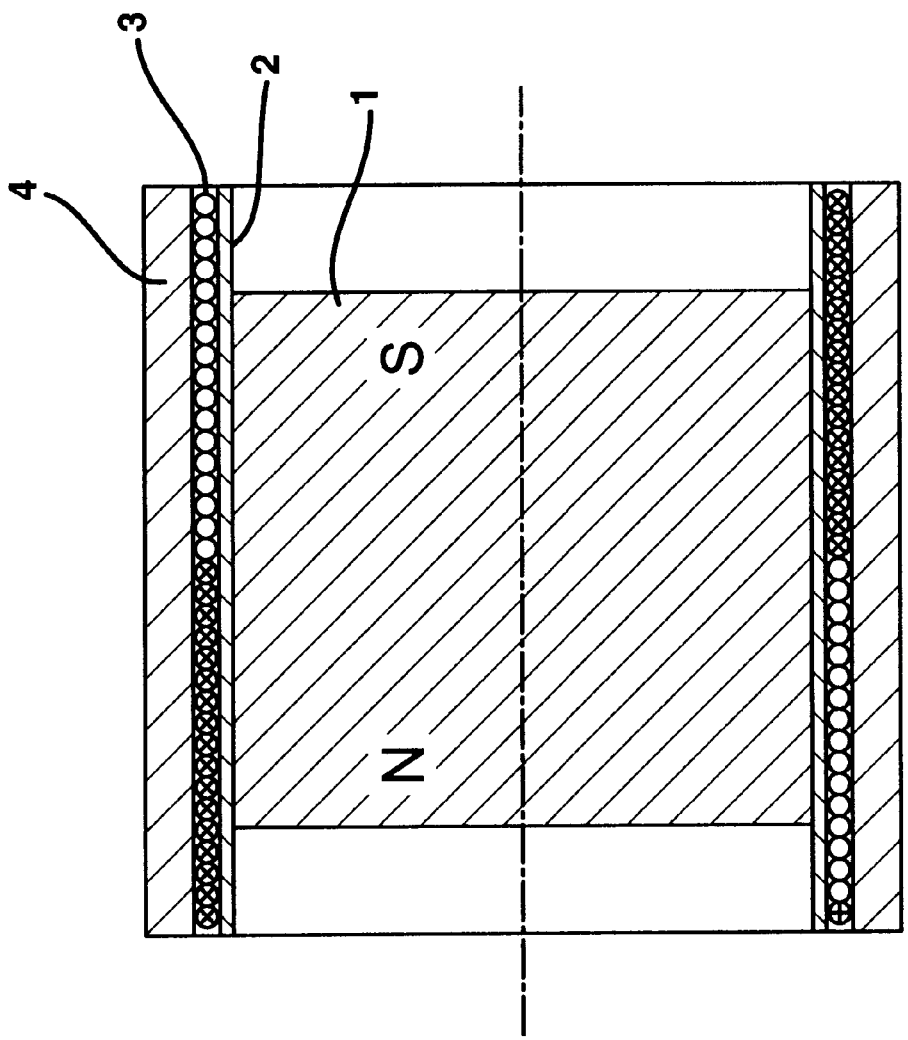
FIG. 1 is a sectional view of the principle structure of one embodiment of the electromagnetic drive system of the present invention with an integrated path signal generation, specifically a direct current motor with integrated path signal generation.

In the illustrated exemplary embodiment in accordance with FIG. 1, the direct current (DC) linear motor in accordance with the present invention consists of a cylinder-like permanent magnet (1) which is magnetized in an axial direction following a first partial system. Coaxially to the partial system, a solenoid-like coil system (3) is provided, whose axial extent is larger than the extent of the partial system. The coil system (3) consists of two identical serially arranged partial coils in the permanent excited magnetic field in a direction of winding opposite to each other. The coil system is illustrated in FIG. 1 schematically as a one layer system, whereby the reverse of winding direction is indicated by the different direction of the coil current. The connections of each of the two partial coils are fed to the outside either separately or by using a center pickup. A thin walled guide bushing (2) is provided between the permanent magnet (1) and the coil system (3) for guiding and reducing friction. The guide bushing (2) may be electrically conductive or nonconductive. The guide bushing (2) has the same length as the coil system (3), at least in the axial direction.

A yoke (4) is provided radially on the coil system. With respect to the movement axis, the yoke has the same radial symmetry as the coil system (3) and in the axial direction at least the same length. The yoke (4) preferably consists of a soft magnetic material for directing the field and increasing the field strength in the air slot. The yoke (4) may be formed of a material that is electrically conductive or nonconductive.

The yoke (4), coil system (3) and guide bushing (2) form a second partial system. Each of the first and second partial systems may form the movable output portion or runner and the other partial system the stationary stator, depending on the particular mounting in the frame.

The axially magnetized permanent magnet (1) closes its field lines through the air slot between the first and second partial systems, the guide bushing (2), the coil system (3) and yoke (4). The partial coils (3) being mounted in the air slot between the magnet (1) and the yoke (4) generate an axial force for the output movement and simultaneously represent the control winding for the position determination of the moved permanent magnet (1) with respect to the second partial system.

The two identical separate partial coils along with the yoke (4) and the movable permanent magnet (1) represent an inductive path control system along the principle of an alternate voltage divider, without considering its drive function. The moved permanent magnet has a small magnetic resistance which, when inserting the permanent magnet (1) into a partial coil, effects a reduction of the magnetic total resistance and thus an increase in inductance. As a counter movement, the magnet moves from the other partial coil so that the inductance is reduced. By means of an electronic evaluation circuit in accordance with FIG. 2, this inductance change can be measured and the path may be derived from the relationship of the two partial inductances which is path-dependent.

Figure 2:
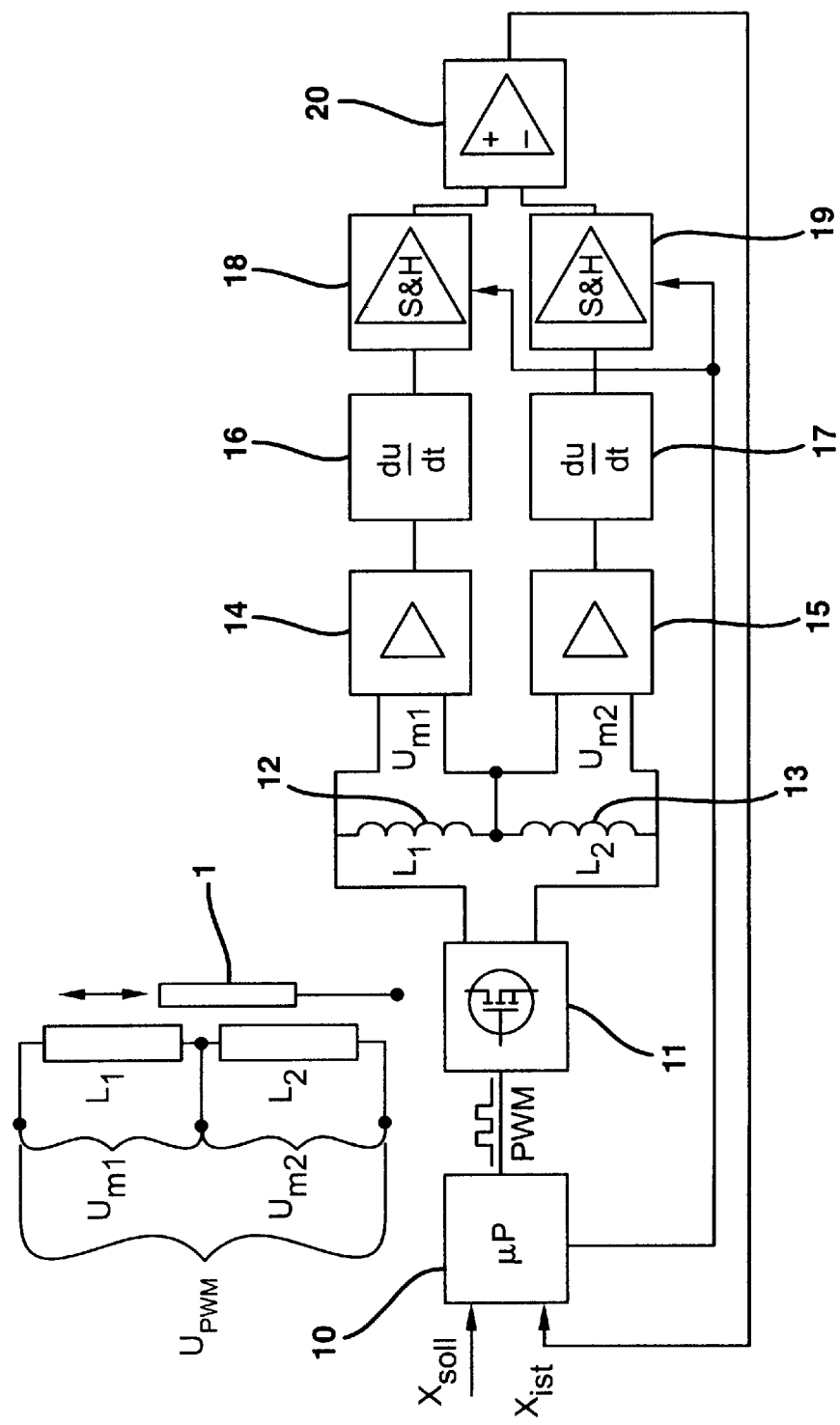
FIG. 2 is an electrical block diagram for control value preparation and start up of the motor.

The two magnetically coupled coils L1, L2 by means of the permanent magnet are switched in series electrically, as shown in FIG.2. The start up of the coil is performed by a pulse width modulated (PWM) square wave voltage (11), so that a resulting direct current for drive purposes is generated by the integration characteristics of the inductances, as is well known. A microprocessor 10 can be used to generate the PWM signal having varying wave characteristics in order to control the direction and amount of runner travel.

For controlling the inductance changes, the voltage drops across the partial coils (12, 13) are each separated through one of a pair of control amplifiers (14, 15), decoupled from the motor and adapted in the signal level to the subsequent electronic evaluation circuit. Thus, the images of the partial voltages of the individual inductances are applied on the outputs of each control amplifier 14 and 15. The method in accordance with the invention is based on the switching behavior of inductances.

By way of example, if an inductance having a series resistance of one Ohm is switched onto a voltage source, it has an infinite resistance, in the ideal case, at the moment the voltage is applied. This voltage rises exponentially over time, depending upon the value of the inductance, in accordance with well known principles of Ohm's Law. If one looks at the voltage curves of the serial switching of two inductances, a triangular wave voltage signal with a positive and negative slope results from the inductance-resistance network with different large inductances, which is superimposed by a rectangular function caused by the one Ohm resistance of the partial coils. The dimension of the slope of the triangular wave voltage component is dependent upon the relationship of the two inductances. If both inductances are equally large, an ideal rectangular function over both partial coils is achieved. By differentiating the value of the resulting slopes, the particular inductance can be determined for each coil. These values can then be compared with the sum corresponding to a particular position of the runner as set forth below.

The inductance ratio of both coils cycled with the pulse frequency may be determined by an electronic differentiation circuit (16, 17) of the voltage signal at the output of the corresponding control amplifier (14,15) shortly after the switching of the pulse width modulated (PWM), set signal. By subtracting the slope value of the voltages of both partial coils, preferably with a substraction circuit (20), the exactness of the inductance ratios may be measured by elimination of direct current interferences. If the picking up of the inductance ratios is performed always at the same point in time after the switching over the set signal and intermediately stored, for example in a corresponding "Sample and Hold" circuit (18,19), a path dependent quasi-continuous direct current signal is provided on the output of subtractor (20). The resulting signal is dependent in wide ranges from the runner position, and therefore, corresponds to the path actual value $X_{ist}$ of the motor.

The signal output $X_{ist}$ from subtractor (20), which is representative of the actual motor position, is preferably fed to the input of a microprocessor (10). Microprocessor (10) is responsive to both the actual motor position signal $X_{ist}$ and a predetermined desired position signal $X_{sol}$ and preferably performs a comparison of the two signals by subtracting one from the other to generate a control difference signal $X_{diff}$. This difference signal $X_{diff}$ is then preferably fed to a control circuit, internal to the microprocessor (10) whereby the microprocessor (10) adjusts the PWM signal to control the position of the runner. The circuit, viewed as a whole, forms a closed loop feedback system, as appreciated by those skilled in the art.

What is claimed is:

1. An electromagnetic drive system having an integral path signal generation and an electromotor comprising:
   a first partial system with at least one permanent magnet;
   a second partial system with a coil system with at least two identical serially switched partial coils being mounted in a permanent magnetically excited magnetic field, each of said first and second partial system form the stationary stator or the movable runner;
   a start up circuit for generating a pulse wide modulated set voltage with a pulse frequency and constant switch voltage in the coil systems;
   an evaluation circuit which derives the slope proportional quasi-continuous voltage value for the relative position between said first partial system including said permanent magnet and the second partial system containing said coil system, by separated differentiation of the voltage paths through the at least two partial coils and subsequent subtracting the differentiated partial voltages at a constant point in time after the flank change in the pulse wide modulated set signal.

2. The electromagnetic drive system with an integrated path signal generation in accordance with claim 1, wherein said evaluation circuit is integrated in the start up circuit.

3. The electromagnetic drive system with integrated path signal generation in accordance with claim 1, wherein the first and second partial systems are linearly displaceable with respect to each other, whereby each of said partial systems may form the stationary stator or said movable runner.

4. The electromagnetic drive system with integrated path signal generation in accordance with claim 1, wherein said coil system and said permanent magnet are substantially cylindrical and have a common symmetry axis, whereby either of said permanent magnet and said coil system, are arranged displaceably in a parallel direction into a common symmetry axis.

5. The electromagnetic drive system with integrated path signal generation in accordance with claim 1, wherein said coil system is encompassed by a magnetic yoke and which supports or influences the magnetic field distribution of the permanent magnetic field.

6. The electromagnetic drive system with integrated path signal generation in accordance with claim 1, wherein an air slot and, an guide bushing, are mounted between said two partial systems.

7. The electromagnetic drive system with integrated path signal generation in accordance with claim 1, wherein two pole shoes are provided axially on said permanent magnet for generating radially directed magnetic fields.

8. The electromagnetic drive system with integrated path signal generation in accordance with claim 1, wherein said drive system encompasses an electronic control circuit which compares a control position signal with a predetermined position control value and from the difference of the two signals supplies the input dimension for a position control which adjusts the position of the runner to the position control value.

* * * * *